(12) United States Patent
Lunttila et al.

(10) Patent No.: US 11,463,206 B2
(45) Date of Patent: Oct. 4, 2022

(54) METHOD FOR SCHEDULING RETRANSMISSIONS FOR CONFIGURED GRANTS IN NR-UNLICENSED

(71) Applicant: Nokia Technologies Oy, Espoo (FI)

(72) Inventors: Timo Lunttila, Espoo (FI); Karol Schober, Helsinki (FI); Claudio Rosa, Randers NV (DK)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 16/940,683

(22) Filed: Jul. 28, 2020

(65) Prior Publication Data

US 2021/0044391 A1  Feb. 11, 2021

(51) Int. Cl.
*H04L 1/18* (2006.01)
*H04W 28/04* (2009.01)
(Continued)

(52) U.S. Cl.
CPC ........... *H04L 1/1887* (2013.01); *H04W 28/04* (2013.01); *H04W 72/1268* (2013.01); *H04W 72/14* (2013.01)

(58) Field of Classification Search
CPC ... H04L 1/1887; H04L 1/1671; H04L 1/1822; H04L 1/1896; H04W 28/04; H04W 72/1268; H04W 72/14
See application file for complete search history.

(56) References Cited

U.S. PATENT DOCUMENTS

| 2011/0134813 A1* | 6/2011 | Park | H04L 1/1854 370/280 |
| 2012/0170504 A1* | 7/2012 | Hoymann | H04L 1/1887 370/312 |

(Continued)

FOREIGN PATENT DOCUMENTS

| WO | 2011/038780 A1 | 4/2011 |
| WO | 2017/167308 A1 | 10/2017 |
| WO | 2020/052763 A1 | 3/2020 |

OTHER PUBLICATIONS

"New WID on NR-based Access to Unlicensed Spectrum", 3GPP TSG RAN Meeting #82, RP-182878, Agenda : 9.1.1, Qualcomm Inc., 7 pages.

(Continued)

*Primary Examiner* — Dinh Nguyen
(74) *Attorney, Agent, or Firm* — Harrington & Smith

(57) ABSTRACT

In accordance with example embodiments of the invention there is at least a method and apparatus to perform receiving, by a network device, information comprising a multiple transmission time interval uplink grant with cyclic redundancy check bits scrambled by a radio network temporary identifier; determining, by the network device of a communication network, a subset of data transmissions of a previous burst of data transmissions to be retransmitted by the network device; and performing by the network device retransmission of the subset of data transmissions using scheduled resources of the uplink grant. In addition, to perform determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and sending the information towards the network device for use in retransmission of the subset of data transmissions using scheduled resources of the uplink grant.

24 Claims, 5 Drawing Sheets

---

810: receiving, by a network device of a communication network, information comprising a multiple transmission time interval uplink grant with cyclic redundancy check bits scrambled by a radio network temporary identifier

↓

820: based on the information, determining, by the network device, a subset of data transmissions of a previous burst of data transmissions to be retransmitted by the network device

↓

830: based on the determining, performing by the network device retransmission of the subset of data transmissions using scheduled resources of the uplink grant

(51) Int. Cl.
  *H04W 72/12* (2009.01)
  *H04W 72/14* (2009.01)

(56) References Cited

U.S. PATENT DOCUMENTS

| | | | |
|---|---|---|---|
| 2013/0242824 A1* | 9/2013 | Lee | H04L 1/1819 370/281 |
| 2015/0256297 A1 | 9/2015 | Yang et al. | |
| 2019/0327761 A1* | 10/2019 | Suzuki | H04W 72/14 |
| 2020/0044793 A1* | 2/2020 | Sundararajan | H04L 5/0007 |

OTHER PUBLICATIONS

International Search Report and Written Opinion received for corresponding Patent Cooperation Treaty Application No. PCT/US2019/045061, dated Aug. 26, 2020, 11 pages.
"Configured UL Grant for NR-U", 3GPP TSG-RAN WG1 Meeting #93, Tdoc R1-1806256, Agenda : 7.6.4.4, Ericsson, May 21-25, 2018, pp. 1-4.
"On Support of UL Transmission with Configured Grants in NR-U", 3GPP TSG RAN WG1 Meeting #93, R1-1806111, Agenda : 7.6.4.4, Nokia, May 21-25, 2018, 4 pages.
"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
"New WID on NR-based Access to Unlicensed Spectrum", 3GPP TSG RAN Meeting #82, RP-182878, Agenda : 9.1.1, Qualcomm Inc., 7 pages, Dec. 10-13, 2018.
"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

* cited by examiner

| 510 UE's CG PUSCH transmission | | | | | 520 gNG scheduling | | | 530 Scheduled UE transmission (assuming LBT passes) | |
|---|---|---|---|---|---|---|---|---|---|
| | h1 | h2 | h3 | h4 | | | | | |
| HARQ ID | #1 | #3 | | #6 | Example G | #1 (new-Tx) | 2 | #3 (re-Tx) | #6 (re-Tx) |
| | | | #4 | #5 | Example H | #1 (re-Tx) | 2 | #1 (re-Tx) | #3 (re-Tx) |

FIG. 6

| 610 UE's CG PUSCH transmission | | | | | 620 gNG scheduling | | | 630 Scheduled UE transmission (assuming LBT passes) | | | |
|---|---|---|---|---|---|---|---|---|---|---|---|
| | h1 | h2 | h3 | h4 | | "time offset" | M | | | | |
| HARQ ID | #1 | #3 | | #6 | Example I | #0 | 4 | #1 | #3 | #4 | #6 |
| | | | #4 | #5 | Example J | #1 | 3 | #3 | #4 | #6 | |
| | | | | | Example K | #2 | 2 | #3 | #4 | | | time offset #0 = offset (relative to the first slot of the multi-TTI DCI) pointing at 1st PUSCH transmission in the UL CG-busrt (h1)
time offset #1 = offset (relative to the first slot of the multi-TTI DCI) pointing at 2nd PUSCH transmission in the UL CG-busrt (h2)
time offset #2 = offset (relative to the first slot of the multi-TTI DCI) pointing at 3rd PUSCH transmission in the UL CG-busrt (h3)
time offset #3 = offset (relative to the first slot of the multi-TTI DCI) pointing at 4th PUSCH transmission in the UL CG-busrt (h4)

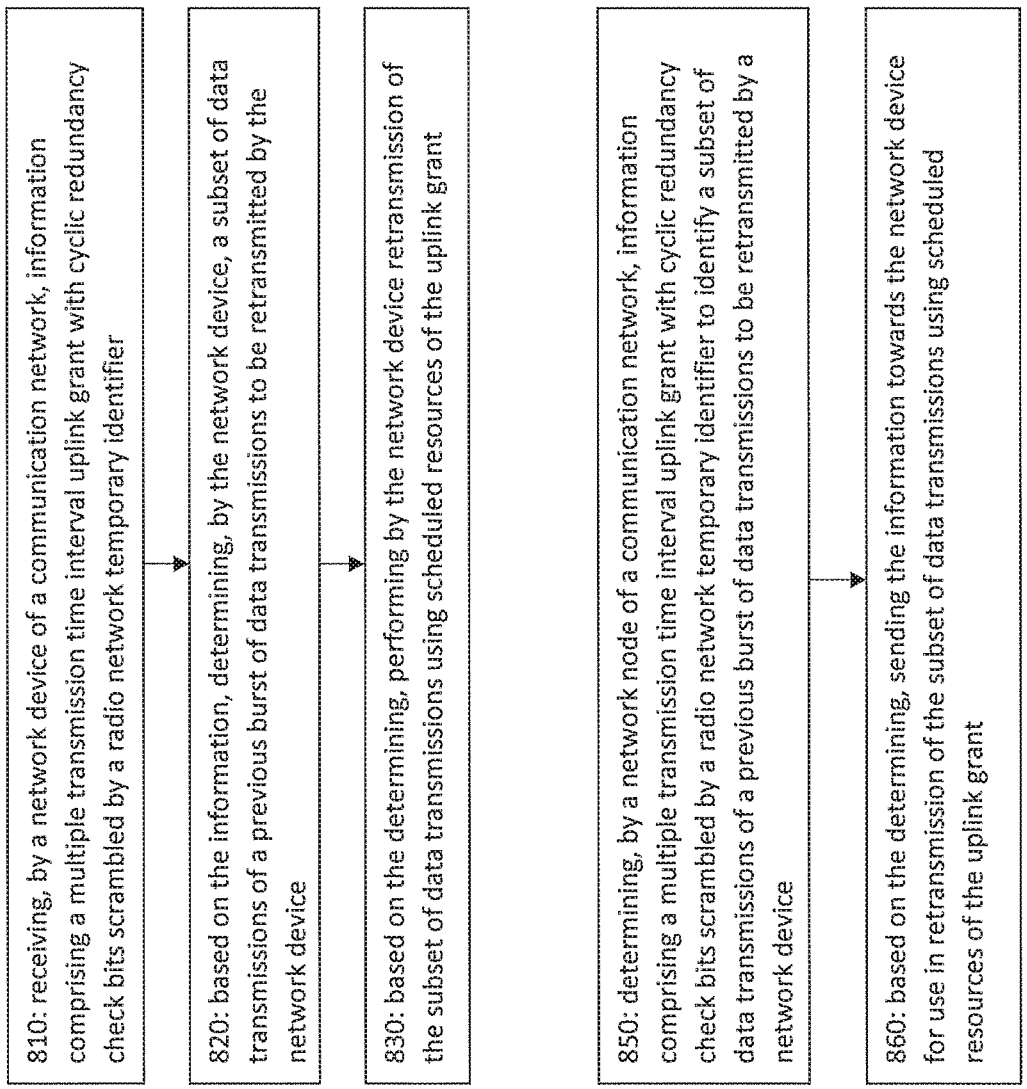

METHOD FOR SCHEDULING RETRANSMISSIONS FOR CONFIGURED GRANTS IN NR-UNLICENSED

TECHNICAL FIELD

The teachings in accordance with the exemplary embodiments of this invention relate generally to scheduling retransmissions for a burst of configured grant transmissions and, more specifically, relate to scheduling retransmissions for a burst of configured grant transmissions using multi-TTI uplink grants.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP 3rd Generation partnership Project
ACK acknowledgement
AUL autonomous Uplink
BW bandwidth
BWP bandwidth Part
CRC cyclic redundancy check
C-RNTI cell radio network temporary identifier
CS-RNTI configured scheduling radio network temporary identifier
CB code block
CBG code block group
CCA clear channel assessment
CG configured grant
CG-UCI configured grant-uplink control information
CP cyclic prefix
C-RNTI c-radio network temporary identifier
CS-RNTI configured scheduling radio network temporary identifier
CWS contention window size
DCI downlink control information
DL downlink
DMRS demodulation reference signal
gNB next generation Node B
HARQ hybrid automatic repeat request
LAA licensed assisted access
LBT listen-before-talk
NDI new data indicator
NR new radio
NR-U new radio unlicensed
PRB physical resource block
PUSCH physical uplink shared channel
RNTI radio network temporary identifier
SPS semi-persistent scheduling
TTI transmission time interval
UCI uplink control information
UE user equipment
UL uplink Wireless communications systems are widely deployed to provide various types of communication content such as voice, video, and/or packet data. Such multiple-access systems include fourth generation (4G) systems such as Long Term Evolution (LTE) systems, LTE-Advanced (LTE-A) systems, or LTE-A Pro systems, and fifth generation (5G) systems which can be referred to as New Radio (NR) systems. Such wireless multiple-access communications system can include a number of base stations or network access nodes, each simultaneously supporting communication for multiple communication devices such as user equipment (UE).

Example embodiments of the invention work to improve at least operations associated with such multiple-access systems as stated above.

SUMMARY

In an example aspect of the invention, there is a method, such as a method performed by a device of FIG. 7, comprising: receiving, by a network device, information comprising a multiple transmission time interval uplink grant with cyclic redundancy check bits scrambled by a radio network temporary identifier; based on the information, determining, by the network device of a communication network, a subset of data transmissions of a previous burst of data transmissions to be retransmitted by the network device; and based on the determining, performing by the network device retransmission of the subset of data transmissions using scheduled resources of the uplink grant.

A further example embodiment is a method comprising the method of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein based on the uplink grant having cyclic redundancy check bits scrambled with a configured scheduled radio network temporary identifier, the network device is including configured grant-uplink control information for each data transmission of the subset and the retransmission is using a scheduled resource of the uplink grant associated with a process identification value for each data transmission, wherein based on the uplink grant having cyclic redundancy check bits scrambled with a cell radio network temporary identifier, the retransmission is using scheduled resources of the uplink grant associated with consecutive process identity values starting with an initial process identity value indicated by the at least one process identification value, indicated with the at least one process identification value of the uplink grant, wherein the at least one process identification value of the uplink grant is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant is determined consecutively starting with at least one process identification value, based on the uplink grant being scrambled by a radio network temporary identifier uplink (dynamic grant RNTI), wherein based on the information indicating a number of transmissions associated with the uplink grant is exceeding the number of retransmissions of the previous burst of data transmissions, the network device is using at least one transmission associated with the uplink grant for transmitting a data with a process identity value other than the process identity values corresponding to processes used for the retransmissions, wherein based on the information indicating a number of transmissions associated with the grant is different than a number of transmissions transmitted in the previous burst of data transmissions by the network device, the network device ignores a new data indicator of the uplink grant and retransmits the previous burst of data transmissions, wherein the at least one process identification value comprises at least one hybrid automatic repeat request process identity, and wherein the information is received from a network node associated with the communication network.

In another example aspect of the invention, there is an apparatus, such by an apparatus as shown in FIG. 7, comprising: means for receiving information comprising a multiple transmission time interval uplink grant with cyclic redundancy check bits scrambled by a radio network temporary identifier; means, based on the information, for determining, by a network device of a communication network, a subset of data transmissions of a previous burst of data transmissions to be retransmitted by the network device; and means, based on the determining, for performing by the network device retransmission of the subset of data transmissions using scheduled resources of the uplink grant.

A further example embodiment is an apparatus comprising the apparatus of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein based on the uplink grant having cyclic redundancy check bits scrambled with a configured scheduled radio network temporary identifier, the network device is including configured grant-uplink control information for each data transmission of the subset and the retransmission is using a scheduled resource of the uplink grant associated with a process identification value for each data transmission, wherein based on the uplink grant having cyclic redundancy check bits scrambled with a cell radio network temporary identifier, the retransmission is using scheduled resources of the uplink grant associated with consecutive process identity values starting with an initial process identity value indicated by the at least one process identification value, wherein the at least one process identification value of the uplink grant is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant is determined consecutively starting with at least one process identification value, based on the uplink grant being scrambled by a radio network temporary identifier uplink (dynamic grant RNTI), wherein based on the information indicating a number of transmissions associated with the uplink grant is exceeding the number of retransmissions of the previous burst of data transmissions, the network device is using at least one transmission associated with the uplink grant for transmitting a data with a process identity value other than the process identity values corresponding to processes used for the retransmissions, the network device is using at least one process identification value corresponding to other processes for the retransmissions, wherein based on the information indicating a number of transmissions associated with the grant is different than a number of transmissions transmitted in the previous burst of data transmissions by the network device, the network device ignores a new data indicator of the uplink grant and retransmits the previous burst of data transmissions, wherein the at least one process identification value comprises at least one hybrid automatic repeat request process identity, and wherein the information is received from a network node associated with the communication network.

In an example aspect of the invention, there is a method, such as a method performed by a device of FIG. 7, comprising: receiving, by a network device, information comprising a multiple transmission time interval uplink grant with cyclic redundancy check bits scrambled by a radio network temporary identifier; based on the information, determining, by the network device of a communication network, a subset of data transmissions of a previous burst of data transmissions to be retransmitted by the network device; and based on the determining, performing by the network device retransmission of the subset of data transmissions using scheduled resources of the uplink grant.

A further example embodiment is a method comprising the method of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein based on the uplink grant having cyclic redundancy check bits scrambled with a configured scheduled radio network temporary identifier, the network device is including configured grant-uplink control information for each data transmission of the subset and the retransmission is using a scheduled resource of the uplink grant associated with a process identification value for each data transmission, wherein based on the uplink grant having cyclic redundancy check bits scrambled with a cell radio network temporary identifier, the retransmission is using scheduled resources of the uplink grant associated with consecutive process identity values starting with an initial process identity value indicated by the at least one process identification value, wherein the at least one process identification value of the uplink grant is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant is determined consecutively starting with at least one process identification value, based on the uplink grant being scrambled by a radio network temporary identifier uplink (dynamic grant RNTI), wherein based on the information indicating a number of transmissions associated with the uplink grant is exceeding the number of retransmissions of the previous burst of data transmissions, the network device is using at least one transmission associated with the uplink grant for transmitting a data with a process identity value other than the process identity values corresponding to processes used for the retransmissions, the network device is using at least one process identification value corresponding to other processes for the retransmissions, wherein based on the information indicating a number of transmissions associated with the grant is different than a number of transmissions transmitted in the previous burst of data transmissions by the network device, the network device ignores a new data indicator of the uplink grant and retransmits the previous burst of data transmissions, wherein the at least one process identification value comprises at least one hybrid automatic repeat request process identity, and wherein the information is received from a network node associated with the communication network.

In another example aspect of the invention, there is an apparatus, such by an apparatus as shown in FIG. 7, comprising: means for receiving information comprising a multiple transmission time interval uplink grant with cyclic redundancy check bits scrambled by a radio network temporary identifier; means, based on the information, for determining, by a network device of a communication network, a subset of data transmissions of a previous burst of data transmissions to be retransmitted by the network device; and means, based on the determining, for performing by the network device retransmission of the subset of data transmissions using scheduled resources of the uplink grant.

A further example embodiment is an apparatus comprising the apparatus of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein based on the uplink grant having cyclic redundancy check bits scrambled with a configured scheduled radio network temporary identifier, the network device is including configured grant-uplink control information for each data transmission of the subset and the retransmission is using a scheduled resource of the uplink grant associated with a process identification value for each data transmission, wherein based on the uplink grant having cyclic redundancy check bits scrambled with a cell radio network temporary identifier, the retransmission is using scheduled resources of the uplink grant associated with consecutive process identity values starting with an initial process identity value indicated by the at least one process identification value, wherein the at least one process identification value of the uplink grant is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant is determined consecutively starting with at least one process identification value, based on the uplink grant being scrambled by a radio network temporary identifier uplink (dynamic grant RNTI), wherein based on the information indicating a number of transmissions associated with the uplink grant is exceeding the number of retransmissions of the previous burst of data transmissions, the network device is using at least one transmission associated with the uplink grant for transmitting a data with a process identity value other than the process identity values corresponding to processes used for the retransmissions, the network device is using at least one process identification value corresponding to other processes for the retransmissions, wherein based on the information indicating a number of transmissions associated with the grant is different than a number of transmissions transmitted in the previous burst of data transmissions by the network device, the network device ignores a new data indicator of the uplink grant and retransmits the previous burst of data transmissions, wherein the at least one process identification value comprises at least one hybrid automatic repeat request process identity, and wherein the information is received from a network node associated with the communication network.

In a further exemplary embodiment of the invention, an apparatus comprises one or more processors and one or more memories including computer program code. The one or more memories and the computer program code configured, with the one or more processors, to cause the apparatus to perform at least: receiving, by a network device, information comprising a multiple transmission time interval uplink grant with cyclic redundancy check bits scrambled by a radio network temporary identifier; based on the information, determining, by the network device of a communication network, a subset of data transmissions of a previous burst of data transmissions to be retransmitted by the network device; and based on the determining, performing by the network device retransmission of the subset of data transmissions using scheduled resources of the uplink grant.

Another exemplary embodiment comprises a computer program comprising code for receiving, by a network device, information comprising a multiple transmission time interval uplink grant with cyclic redundancy check bits scrambled by a radio network temporary identifier; based on the information, determining, by the network device of a communication network, a subset of data transmissions of a previous burst of data transmissions to be retransmitted by the network device; and based on the determining, performing by the network device retransmission of the subset of data transmissions using scheduled resources of the uplink grant.

In a further exemplary embodiment of the invention, a method, such as a method performed by a device of FIG. 7, is disclosed that comprises determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

A further example embodiment is a method comprising the method of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein the uplink grant having the cyclic redundancy check bits scrambled with a configured scheduled radio network temporary identifier to cause the network device to include configured grant-uplink control information for each data transmission of the subset and to use a scheduled resource of the uplink grant associated with a process identification value for each data transmission of the retransmission, wherein the uplink grant is having the cyclic redundancy check bits scrambled with a cell radio network temporary identifier to cause the network device to use for the retransmission scheduled resources of the uplink grant associated with consecutive process identity values starting with an initial process identity value indicated by the at least one process identification value, wherein the at least one process identification value is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant can be determined consecutively starting with at least one process identification value, based on the uplink grant being scrambled by a radio network temporary identifier uplink (dynamic grant RNTI), and wherein the at least one process identification value comprises at least one hybrid automatic repeat request process identity.

In another exemplary embodiment of the invention, an apparatus, such as an apparatus as shown in of FIG. 7, is disclosed that comprises means for determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and means, based on the determining, for sending the information towards the network device for use in retransmission of the subset of data transmissions using scheduled resources of the uplink grant.

A still another example embodiment is an apparatus comprising the apparatus of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein the uplink grant having the cyclic redundancy check bits scrambled with a configured scheduled radio network temporary identifier to cause the network device to include configured grant-uplink control information for each data transmission of the subset and to use a scheduled resource of the uplink grant associated with a process identification value for each data transmission of the retransmission, wherein the uplink grant is having the cyclic redundancy check bits scrambled with a cell radio network temporary identifier to cause the network device to use for the retransmission scheduled resources of the uplink grant associated with consecutive process identity values starting with an initial process identity value indicated by the at least one process identification value, wherein the at least one process identification value is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant can be determined consecutively starting with at least one process identification value, based on the uplink grant being scrambled by a radio network temporary identifier uplink (dynamic grant RNTI), and wherein the at least one process identification value comprises at least one hybrid automatic repeat request process identity.

In a further exemplary embodiment of the invention, an apparatus comprises one or more processors and one or more memories including computer program code. The one or more memories and the computer program code configured, with the one or more processors, to cause the apparatus to perform at least: determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

Another exemplary embodiment comprises a computer program comprising code for determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

Another exemplary embodiment comprises a computer program comprising code for receiving, by a network device, information comprising a multiple transmission time interval uplink grant with cyclic redundancy check bits scrambled by a radio network temporary identifier; based on the information, determining, by the network device of a communication network, a subset of data transmissions of a previous burst of data transmissions to be retransmitted by the network device; and based on the determining, performing by the network device retransmission of the subset of data transmissions using scheduled resources of the uplink grant.

In a further exemplary embodiment of the invention, a method, such as a method performed by a device of FIG. 7, is disclosed that comprises determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

A further example embodiment is a method comprising the method of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein the uplink grant having the cyclic redundancy check bits scrambled with a configured scheduled radio network temporary identifier to cause the network device to include configured grant-uplink control information for each data transmission of the subset and to use a scheduled resource of the uplink grant associated with a process identification value for each data transmission of the retransmission, wherein the uplink grant is having the cyclic redundancy check bits scrambled with a cell radio network temporary identifier to cause the network device to use for the retransmission scheduled resources of the uplink grant associated with consecutive process identity values starting with an initial process identity value indicated by the at least one process identification value, wherein the at least one process identification value is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant can be determined consecutively starting with at least one process identification value, based on the uplink grant being scrambled by a radio network temporary identifier uplink (dynamic grant RNTI), and wherein the at least one process identification value comprises at least one hybrid automatic repeat request process identity.

In another exemplary embodiment of the invention, an apparatus, such as an apparatus as shown in of FIG. 7, is disclosed that comprises means for determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and means, based on the determining, for sending the information towards the network device for use in retransmission of the subset of data transmissions using scheduled resources of the uplink grant.

A still another example embodiment is an apparatus comprising the apparatus of the previous paragraph, wherein the subset of data transmissions is of at least one physical uplink shared channel transmission of the previous burst of data transmissions to be retransmitted, wherein information comprising the uplink grant comprises at least one process identification value associated with the previous burst of data transmissions to be retransmitted and a number of transmission time intervals scheduled by the uplink grant, wherein the uplink grant having the cyclic redundancy check bits scrambled with a configured scheduled radio network temporary identifier to cause the network device to include configured grant-uplink control information for each data transmission of the subset and to use a scheduled resource of the uplink grant associated with a process identification value for each data transmission of the retransmission, wherein the uplink grant is having the cyclic redundancy check bits scrambled with a cell radio network temporary identifier to cause the network device to use for the retransmission scheduled resources of the uplink grant associated with consecutive process identity values starting with an initial process identity value indicated by the at least one process identification value, wherein the at least one process identification value is identifying for the retransmission one of subframe, slot, or symbol of different transmission time intervals of a previously configured grant burst, wherein the at least one process identification value is a first process identification value indicative for a first transmission of the retransmissions, wherein the at least one process identification value is indicative of a time offset relative to a first slot of the uplink grant, wherein the time offset is identifying a first subframe, slot, or symbol for a first transmission of the retransmission, wherein the process identity of at least one further retransmission other than the first transmission of the subset of data transmissions is determined implicitly based on a first process identity of the at least one process identification value and a duration in the uplink grant, wherein each process identification scheduled by the grant can be determined consecutively starting with at least one process identification value, based on the uplink grant being scrambled by a radio network temporary identifier uplink (dynamic grant RNTI), and wherein the at least one process identification value comprises at least one hybrid automatic repeat request process identity.

In a further exemplary embodiment of the invention, an apparatus comprises one or more processors and one or more memories including computer program code. The one or more memories and the computer program code configured, with the one or more processors, to cause the apparatus to perform at least: determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

Another exemplary embodiment comprises a computer program comprising code for determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device; and based on the determining, sending the information towards the network device for use in retransmission of the subset of data transmissions using scheduled resources of the uplink grant.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3 shows examples of how to determine the transmitted HARQ process IDs;

FIG. 4 shows two examples where the UE cannot transmit one of the CG-PUSCH in the burst of CG-PUSCH transmissions;

FIG. 5 shows an example G in accordance with example embodiments of the invention;

FIG. 6 shows an embodiment of Linkage method #2 in accordance with example embodiments of the invention;

FIG. 8A and FIG. 8B each show a method in accordance with example embodiments of the invention which may be performed by an apparatus.

DETAILED DESCRIPTION

Figure 1:
FIG. 1 shows an example for configuration of CG-PUSCH resources.

In example embodiments of this invention there is proposed at least a method and apparatus for scheduling retransmissions for a burst of configured grant transmissions using multi-TTI uplink grants.

In accordance with example embodiments of the invention as described herein there is proposed ways of improving the efficiency of NR-U configured grant operation by enhancing the scheduling of re-transmissions.

Certain example embodiments of the invention relate to 5G new radio (NR) operation in unlicensed spectrum (NR-U) as well as possible further releases of LTE Licensed Assisted Access (LAA) The focus is especially for grant free operation, a.k.a. uplink configured grants.

For an NR Rel-15 baseline operation it is noted that in the uplink, the gNB can always dynamically allocate resources to UEs via the C-RNTI on PDCCH(s). A UE always monitors the PDCCH(s) in order to find possible grants for uplink transmission when its downlink reception is enabled (activity governed by DRX when configured).

In addition, with Configured Grants, the R15 gNB can allocate uplink resources for the initial HARQ transmissions to UEs. Two types of configured uplink grants are defined:
  With Type 1, RRC directly provides the configured uplink grant (including the periodicity); and/or
  With Type 2, RRC defines the periodicity of the configured uplink grant while PDCCH addressed to CS-RNTI can either signal and activate the configured uplink grant, or deactivate it; i.e. a PDCCH addressed to CS-RNTI[1] uplink grant can be implicitly reused according to the periodicity defined by RRC, until deactivated.
  When a configured uplink grant is active, if the UE cannot find its C-RNTI/CS-RNTI on the PDCCH(s), an uplink transmission according to the configured uplink grant can be made. Otherwise, if the UE finds its C-RNTI/CS-RNTI on the PDCCH(s), the PDCCH allocation overrides the configured uplink grant.

CS-RNTI corresponds to Configured Scheduling and retransmissions other than repetitions are explicitly allocated via PDCCH(s).

A somewhat similar mechanism is also supported in LTE, where Rel-15 WI "Enhancements to LTE operation in unlicensed spectrum" introduced support for autonomous UL transmissions on unlicensed spectrum (SCells in Licensed Assisted Access) with following key characteristics:
  Autonomous UL Access (AUL):
    A UE can be RRC configured with a set of subframes and HARQ processes that it may use for autonomous PUSCH transmissions;
    AUL operation is activated and released with DCI format 0A or 4A;
    A UE skips an AUL allocation if there is no data in UL buffers;
    PRB allocation, MCS, as well as DMRS cyclic shift and orthogonal cover code are indicated to the UE with AUL activation DCI;
    The UE indicates to the eNodeB along with each UL transmission the selected HARQ-process ID, new data indicator, redundancy version, UE ID, PUSCH starting and ending points, as well as whether the UE-acquired channel occupancy time (COT) can be shared with the eNodeB; and/or
    The eNodeB may provide to the UE HARQ feedback for AUL-enabled HARQ processes, transmit power command, and transmit PMI via a DL control signaling message called AUL-DFI.
  AUL also allows for configuring a set of starting positions for UEs with a very fine raster within the first SC-FDMA symbol of a subframe: 16, 25, 34, 43, 52, or 61 microseconds after the subframe boundary, or at the beginning of symbol #1. Since all UEs perform listen-before-talk operation prior to the AUL transmission to determine whether the channel is free, different starting points allow for e.g. prioritizing transmissions for certain UEs (by assigning an earlier starting point) and reducing the number of collisions. The transmission within the 1st symbol is not PUSCH data but instead a very long CP extended from the next symbol #2. In essence, the CP extension is used for reserving the channel for the given UE by blocking other UEs.

Below are some agreements for NR-U Configured Grants (with some relevant parts underlined):
  Support both Type 1 and Type 2 CG; and The following modifications to the configured grant procedures are beneficial (not full list):
  Removing dependencies of HARQ process information to the timing. This can be achieved by introducing UCI on PUSCH to carry HARQ process ID, NDI, RVID:
    UE selects the HARQ process ID from an RRC configured set of HARQ IDs; and
  Additional information fields to be included in the UCI include at least:
    HARQ ID,
    NDI & RV,
    COT sharing information, FFS details,
    FFS: other information including UE ID;
  Introducing Downlink Feedback Information (DFI) including pending HARQ feedback;
  Increased flexibility on time domain resource allocation
    E.g. bitmap based approach, or
    NR Rel-15 based time domain resource allocation approach, which includes {periodicity, offset in the frame, start symbol and length of PUSCH and K-repetition signaling},
    Additional aspects such as finer granularity of resource allocation, and multiple resources within a period may be considered for enhancing flexibility on time domain resource allocation.
  Supporting retransmissions without explicit UL grant, also on CG resources
  In absence of feedback, UE may not assume ACK (but rather NACK, based on some timer)
  Allowing consecutive CG resources in time without any gaps in between the resources and non-consecutive configured grant resources (not necessarily periodic) with gaps in between the resource
  To manage collisions between users, multiple pseudo-random starting positions are introduced with sub-symbol granularity
    User with later starting point will detect and earlier user when performing LBT, and omit its transmission
  For configured grant time domain resource allocation, the mechanisms in Rel-15 (both Type 1 and Type 2) are extended so that the number of allocated slots following the time instance corresponding to the indicated offset can be configured In accordance with example embodiments of this invention there is a focus on improving the scheduling of retransmission for CG-PUSCH transmissions, such that the network can efficiently trigger a UE to transmit again the data that was sent on CG-PUSCH resources, but has not been correctly received.

Unlicensed spectrum is by its nature not as reliable as licensed spectrum for wireless communications. This is because transmissions are often originating from multiple different nodes using potentially different radio access technologies and therefore uncoordinated. This can cause burst like interference onto the operating channels, causing occasional errors in decoding of the data. One efficient way to cope with occasional errors is to repeat transmissions multiple times to increase the received energy per bit ratio, and to provide time domain diversity against interference.

In addition to reliability, another key performance indicator (KPI) for wireless services is latency. When considering uplink operation on unlicensed spectrum, latency is a special concern: since all nodes need to typically perform listen-before-talk (LBT) prior to transmitting on unlicensed spectrum to verify that the channel is actually unoccupied, it cannot be guaranteed that a transmission can always take place when intended. That is, each LBT procedure required prior to a transmission will extend that latency to some extent. This is an issue in particular with scheduled uplink transmissions, since a UE will first need to transmit a scheduling request (LBT#1), after which the gNB transmits to the UE an UL grant (LBT#2), and only after receiving the UL grant the UE may transmit the UL data (after performing yet another LBT, #3).

One way to reduce latency associated with UL transmissions on unlicensed spectrum is to use configured grants. With configured grants, the gNB can assign to a UE (or typically a group of UEs) certain time-frequency resources that are periodically available, and the UE is allowed to transmit on those without having to send a scheduling request first.

In NR-Unlicensed, the CG resources are assigned to UEs with RRC signaling, indicating the periodicity of a burst of CG resources, the duration of such burst, as well as the starting slot for the burst. Additionally, resources may be activated or deactivated with downlink control information transmitted via PDCCH (denoted in NR as SPS activation and SPS release). Moreover, there may be short gaps between the resources to allow for UEs to perform LBT prior to each transmission.

An example of this is shown in FIG. 1, where the periodicity is set to 10 slots, and the duration of each burst of CG resources is 3 slots. As shown in FIG. 1 there is an example for configuration of CG-PUSCH resources. A burst of 6 resources, half-slot each, is repeated every 10 slots, with small gaps 110 and 120 in between the resources to facilitate LBT. Furthermore, as shown in FIG. 1 each slot is divided in half, such that there are two non-overlapping PUSCH resource allocations in each slot, each having a duration of 7 symbols (including the LBT gap).

Figure 2:
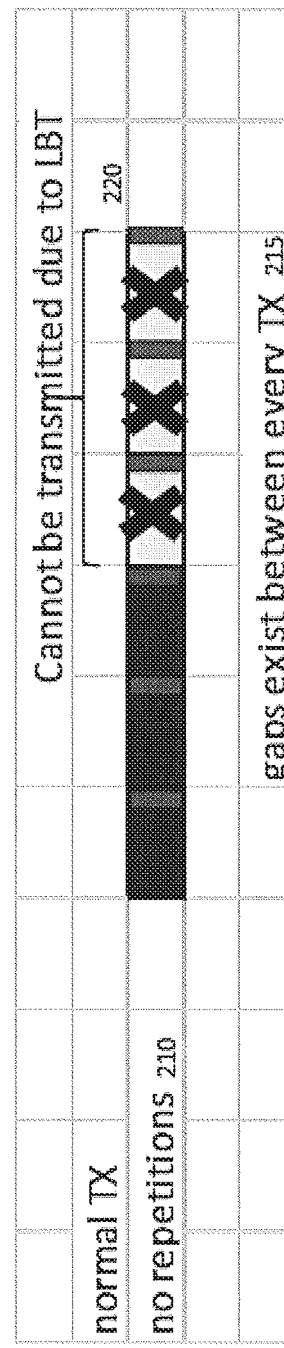
FIG. 2 shows an example where a channel may be occupied at the beginning of the burst and becomes free during the burst.

While LBT gaps are useful in allowing for fair time domain multiplexing of UEs, on the other hand, in each gap, there is a chance that a particular UE loses the channel due to negative LBT outcome. This is shown in FIG. 2. In a different example, the channel may be occupied at the beginning of the burst and becomes free during the burst.

As shown in FIG. 2 gaps 220 exist between every Tx 215. As such, since a UE needs to perform LBT prior to each PUSCH transmission in a burst, there is a chance that it will not be able to transmit on all configured resources.

Typically, a UE may transmit during multiple PUSCH allocations within a burst of UL CG resources Unlike in Rel-15 CG operation, with Rel-16 NR-U configured grants a UE may by itself choose the HARQ process it uses for each CG transmission amongst the HARQ processes for which CG operation is enabled. This means that for a burst of a few consecutive CG-PUSCH transmissions, the HARQ IDs may in principle be in any arbitrary order. This complicates the scheduling of retransmissions of such data packets, as the gNB would need to provide a separate UL grant to schedule each CG-PUSCH transmission, leading to significant DL control channel (PDCCH) overhead. Moreover, the PDCCH capacity, or UE's decoding capability may not allow for scheduling of multiple UL grants in a single DL slot.

In example embodiments of the invention there is provided a framework facilitating more flexible scheduling of retransmissions for configured grant PUSCH transmissions, making use of multi-TTI UL grants.

One prior art solution for scheduling of retransmissions of CG-PUSCH is as follows:

Allow the UE to use autonomous retransmissions on CG-PUSCH resources after receiving a negative ACK for a given transport block via Downlink Feedback Information (DFI):

The drawback of this approach is increased latency, as well as possible collisions with CG-PUSCHs of other UEs, since the same CG resource is typically configured to multiple UEs;

Scheduled retransmissions with normal UL grants

This leads to large PDCCH overhead and/or low scheduling flexibility due to limited UE capability, as a separate grant is needed for each PUSCH allocation; and/or Scheduled retransmissions with a multi-TTI UL grants using consecutive HARQ-IDs for the scheduled HARQ processes This is often impractical, since the HARQ process IDs that a multi-TTI UL grant can schedule are always consecutive, while HARQ the HARQ process IDs of a burst of CG-PUSCH transmission may appear in any order As discussed herein, all three existing approaches have clear drawbacks, and example embodiments of the invention at least provide improved solutions for triggering of CG-PUSCH retransmissions.

Figure 7:
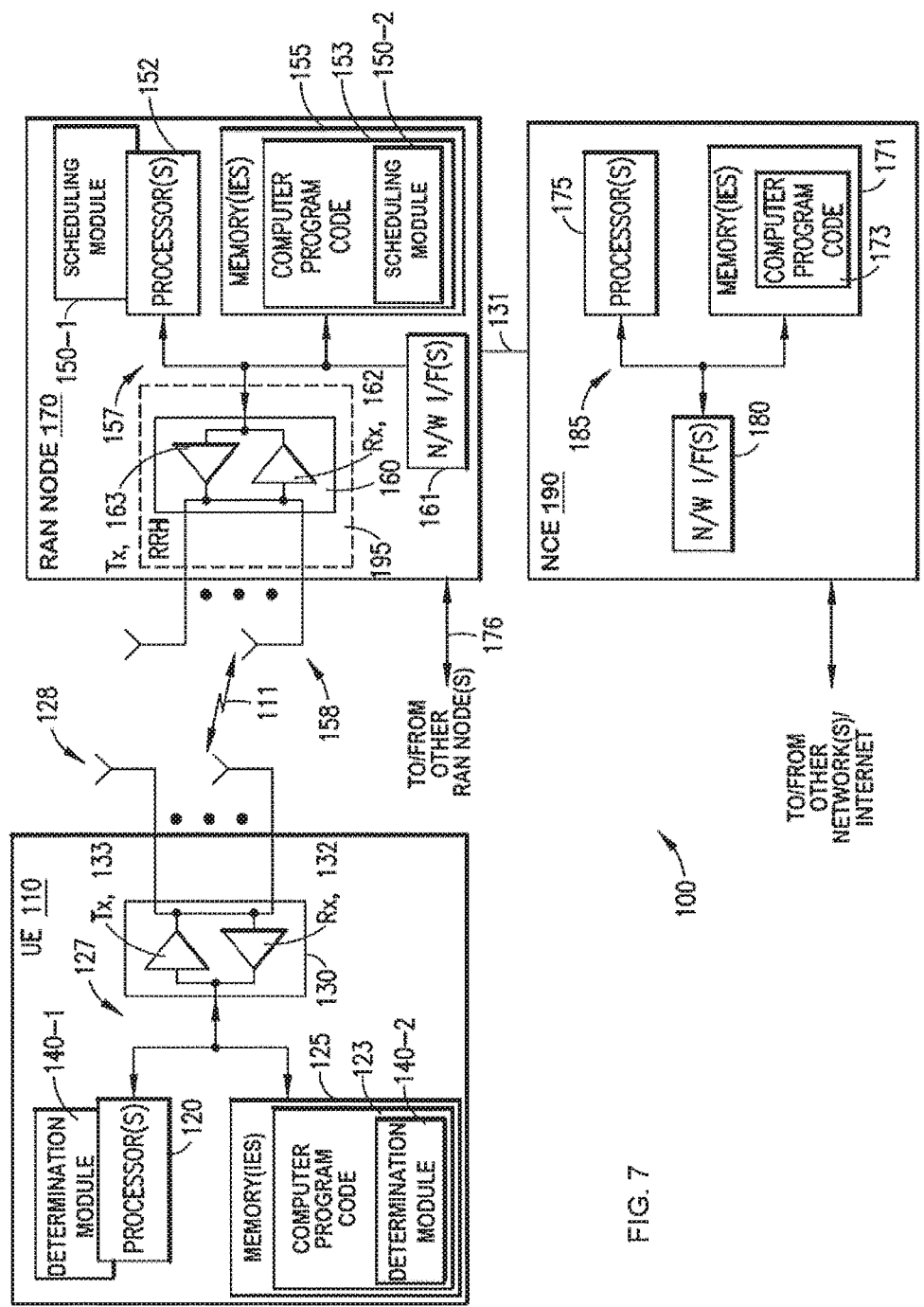
FIG. 7 shows a high level block diagram of various devices used in carrying out various aspects of the invention.

Before describing the example embodiments of the invention in detail, reference is made to FIG. 7 for illustrating a simplified block diagram of various electronic devices that are suitable for use in practicing the example embodiments of this invention.

Turning to FIG. 7, this figure shows a block diagram of one possible and non-limiting exemplary system in which the exemplary embodiments may be practiced. In FIG. 7, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a determination module, comprising one of or both parts 140-1 and/or 140-2, which may be implemented in a number of ways. This determination module is an optional module and can be customized with software and/or processors to perform example embodiments of the invention as disclosed herein. These determination modules parts can include processor configurations that can be implemented to perform example embodiments of the invention as disclosed herein. The determination module may be implemented in hardware as determination module 140-1, such as being implemented as part of the one or more processors 120. The determination module 140-1 may be implemented also as an integrated circuit or through other hardware such as a programmable gate array. In another example, the determination module may be implemented as determination module 140-2, which is implemented as computer program code 123 and is executed by the one or more processors 120. In addition, the determination modules as shown in FIG. 7 are optional and their operations can be performed by other devices of the UE 110 as shown in FIG. 7. For instance, the one or more memories 125 and the computer program code 123 may be configured, with the one or more processors 120, to cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (e.g. a base station) in a NR/5G network such as a gNB (a node that provides NR user plane and control protocol terminations towards the UE 110) or an ng-eNB (a node providing E-UTRA user plane and control plane protocol terminations towards the UE 110, and connected via an NG interface to the core network (i.e. 5G Core (5GC)). The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a scheduling module, comprising one of or both parts 150-1 and/or 150-2. These scheduling module parts can include processor configurations that can be implemented to perform example embodiments of the invention as disclosed herein, which may be implemented in a number of ways. The scheduling module may be implemented in hardware as scheduling module 150-1, such as being implemented as part of the one or more processors 152. The scheduling module 150-1 may be implemented also as an integrated circuit or through other hardware such as a programmable gate array. In another example, the scheduling module may be implemented as scheduling module 150-2, which is implemented as computer program code 153 and is executed by the one or more processors 152. In addition, the scheduling modules as shown in FIG. 7 are optional and their operations can be performed by other devices of the RAN node 170 as shown in FIG. 7. For instance, the one or more memories 155 and the computer program code 153 are configured to, with the one or more processors 152, to cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

In other operations there have been considered the problem of failed detection of a configured grant transmission by a UE. However, the proposed solution did not consider use of multi-TTI UL grants as is considered herein.

In one example embodiments in accordance with the invention there is a new method defined for scheduling retransmissions for a burst of CG-PUSCH transmissions using multi-TTI UL grants. More specifically, there is proposed at least a method and apparatus for:

1. indicating to a UE which of the CG-PUSCH transmissions in a burst of CG-PUSCH resources the UE should retransmit; and
2. defining a linkage between a multi-TTI UL grant and a burst of CG-PUSCH transmissions In addition, the method comprises two variants (Case 1 and Case 2 below) for indicating the HARQ process ID for the HARQ processes that the UE shall re-transmit.

Case 1: the gNB leaves full freedom for a UE to choose the HARQ-ID within the CG-PUSCH burst. For retransmissions, when the UE receives a multi-TTI UL grant for CG-PUSCH, it shall re-interpret the HARQ-IDs for the (re)transmitted CG-PUSCHs:

Linkage method #1: Multi-TTI UL grant indicates explicitly the HARQ-ID of the first CG-PUSCH that needs to be (re)transmitted, and the number of (re-)transmitted PUSCHs ("M"). The HARQ-IDs for the CG-PUSCH transmission other than the first one are determined implicitly based on the first HARQ-ID and the duration M in the multi-TTI UL grant;

Linkage method #2: Alternatively, the HARQ-ID signaled by gNB in the multi-TTI scheduling DCI may be re-interpreted as an indication of the time instance of the first re-transmitted CG-PUSCH, the number of remaining re-transmissions is determined implicitly based on the first HARQ-ID and the duration of the multi-TTI UL grant.

Case 2: the gNB instructs (configures) a UE to choose the HARQ-IDs for a CG transmission within a burst consecutively:

This way the gNB can easily schedule the retransmission using a multi-TTI UL grant.

The detailed UE operation according to the invention is as follows:

Step 1: Receiving, from a gNB, a configuration of CG PUSCH resources, and an indication of HARQ processes applicable for CG-PUSCH transmission (e.g. HARQ processes 1 . . . $N_{HARQ\_CG}$);

Step 2: Transmitting N (at least one) CG-PUSCH transmissions on a burst of resources configured for CG-PUSCH, and selecting a HARQ process ID for each such CG-PUSCH transmission:

Assume HARQ IDs for each CG-PUSCH transmission is denoted as $h_1, h_2, \ldots, h_N$, while chosen values are not necessarily in any particular order;

Step 3: Receiving, from a gNB, a multi-TTI UL grant scheduling M PUSCH (re)transmissions, comprising:
an indication of the HARQ process ID, and
An indication of a value M denoting the # of scheduled PUSCH transmissions:
Note: both indications can be present in the multi-TTI UL grant;

Step 4: Determining whether bits such as cyclic redundancy check bits of the multi-TTI UL grant are scrambled with C-RNTI or CS-RNTI (i.e. RNTI used for CG transmissions);

Step 5a: If the multi-TTI UL grant is scrambled with CS-RNTI (Case 1 above):
UE shall include CG-UCI into each scheduled (re) transmission,
UE transmits the first PUSCH within the scheduled M PUSCH transmissions using the HARQ process ID indicated in step 3

Linkage method #1: the HARQ-ID (this may be anything in the range $h_1, h_2, \ldots h_N$) in the multi-TTI UL grant identifies the HARQ ID of the first retransmitted CG-PUSCH transmission, Linkage method #2: the UE reinterprets the HARQ process ID in the multi-TTI UL grant as a time offset, relative to the first slot of the multi-TTI DCI, pointing at the subframe, slot, half-slot or symbol of the first CG-PUSCH transmission in the UL CG burst to be retransmitted. E.g. HARQ ID #0 in the multi-TTI UL grant may correspond to a CG-PUSCH that was transmitted in a slot "x" that was two slots before the slot in which the multi-TTI UL grant was received (i.e. x=2), HARQ ID #1 corresponds to x=3, HARQ ID #2 corresponds to x=4, and so forth. This may provide an alternative link between multi-TTI DCI and CG burst, The HARQ-IDs for the further M-1 TTIs are determined as follows:

The next transmissions are the ones following the transmission with the indicated HARQ ID (or the HARQ ID of the CG-PUSCH transmission the re-interpreted HARQ ID field points at, as described for linkage method #2). This covers transmissions up to $h_N$ . . . . For transmissions going beyond $h_N$ there are two alternatives:

Alt1: If the multi-TTI grant indicates number of HARQ processes M going beyond $h_N$, the UE may transmit on those resources data corresponding to other HARQ-processes configured for CG-transmissions, Alt2: M can serve as DAI (Downlink Assignment Indicator), to ensure the gNB did not miss (both UCI and PUSCH) any transmission from the UE within the burst. If the UE detects M to be different from the number of PUSCH detected within the CG burst, it will ignore NDI in the UL multi-TTI grant and re-transmit all PUSCHs from the CG-PUSCH burst;

Step 5b: If bits such as cyclic redundancy check bits of the multi-TTI UL grant are scrambled with C-RNTI:
CG-UCI is not included into scheduled transmissions,
HARQ process numbering is consecutive starting from the indicated HARQ-ID in the multi-TTI UL grant, As an embodiment, the gNB may indicate to the UE (e.g. with RRC signaling) that the HARQ-processes the UE chooses for CG transmissions shall be consecutive (Case 2 above), As an embodiment, when the multi-TTI UL grant schedules a retransmission for a HARQ process that has been transmitted with CG-PUSCH, the HARQ processes that the multi-TT UL grant indicates are limited to the subset of HARQ processes applicable for CG-PUSCH transmission:

e.g. assuming 16 HARQ processes, and HARQ processes 1-5 enabled for CG-PUSCH, if HARQ ID indicated in the multi-TTI UL grant is #3, and M=4 transmissions are scheduled, UE shall transmit HARQ processes #3, #4, #5, & #1.

It is noted that in accordance with an example embodiment of the invention a process identification value, such as the HARQ ID or a HARQ process identification can be based on at least one bit field indicated to a network device with signaling such as but not limited to an uplink grant. Further, the process identification value may indicate explicitly the HARQ process identity of certain data transmission, or it may indicate e.g. a reference in time to a previous data transmission. In addition, in accordance with example embodiments of the invention a process identity value may be e.g., a HARQ process identity that the UE derives based on one or more process identification values.

Figures 3, 4:
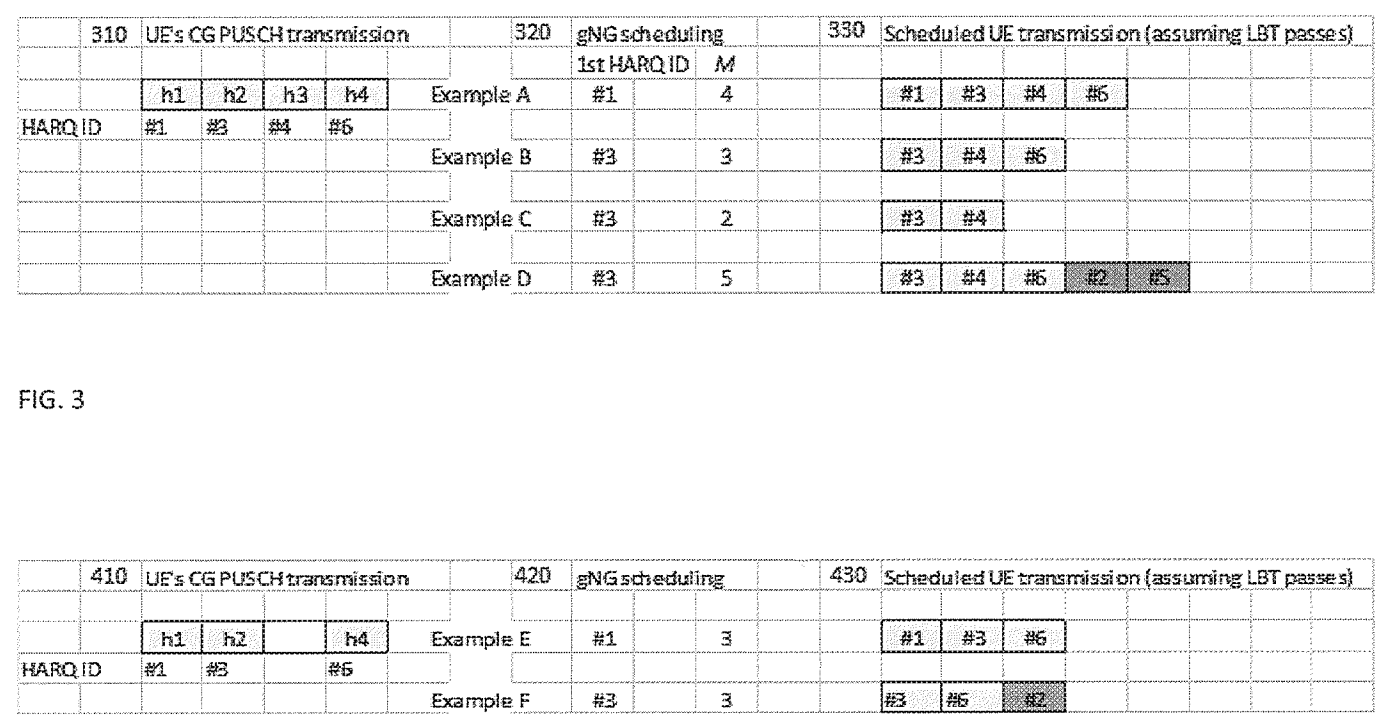

Some examples in accordance with example embodiments of the invention for how to determine the transmitted HARQ processes can be seen with FIG. 3.

FIG. 3 shows examples of how to determine the transmitted HARQ process IDs. FIG. 3 shows UE PUSCH Transmission 310, gNB scheduling 320, and Scheduled UE transmission 330. As shown in FIG. 3 the UE PUSCH Transmission 310 and the gNB scheduling 320 are using the four examples (A to D) of how to use and/or determine the transmitted HARQ process IDs according to example embodiments of the invention. In all cases (A to D) it is assumed as a starting point that a UE has transmitted four TBs on consecutive CG-PUSCH resources, corresponding to HARQ IDs h1=1, h2=3, h3=4 and h4=6. These examples of how to use and/or determine the transmitted HARQ process IDs in accordance with example embodiments of the invention include at least as follows:

Example A: gNB indicates with multi-TTI UL grant that the first HARQ ID to be retransmitted is #1, and M=4 TBs are to be transmitted. The HARQ processes for the remaining three TBs are the same ones as those in the CG-PUSCH burst that the UE transmitted, i.e. #3, 4, and 6; UE follows NDI per HARQ process indicated in UL grant, Example B: gNB may have missed (or NOT correctly received) the TB for HARQ process #1 as well as the corresponding UCI), and decides to schedule M=3 TBs, the first one having HARQ ID #3. Correspondingly, the UE transmits HARQ processes #3, 4, and 6;

Example C: this is the same as example B, but gNB schedules a transmission of just two HARQ processes, #3 and the next consecutive one (#4); and Example D (corresponds to Alt.1 of Step 5a): in this case, the gNB schedules with the multi TTI UL grant for M=5 TBs, the first one corresponding to HARQ process #3. Since the UE's CG-PUSCH only included 4 TBs (and 3 TBs counting from HARQ process ID #3 onwards), the UE will use the other two remaining granted PUSCH resources for transmitting data corresponding to other CG-enabled HARQ processes of its choice (in this example D those are #2 and #5)

FIG. 4 shows two examples E and F where the UE cannot transmit one of the CG-PUSCH in the burst of CG-PUSCH transmissions, e.g. due to failed LBT. Further, FIG. 4 shows UE CG PUSCH Transmission 410, gNB scheduling 420, and Scheduled UE transmission 430. These two examples include where the UE cannot transmit one of the CG-PUSCH (h3) in the burst of CG-PUSCH transmissions, leaving an empty gap between h2 and h4.

Example E: gNB schedules to the UE three CG-PUSCH resources, with the first HARQ ID being #1. The UE transmits on the next two resources also the PUSCHs for other two HARQ processes it used in that burst, i.e. #3 and #6, Example F (corresponds to Alt1 of Step 5a): gNB schedules with the multi TTI UL grant for M=3 TB s, the first one corresponding to HARQ process #3. Since the UE's only transmitted 2 consecutive TBs (HARQ processes #1 and #3), the UE will use the remaining granted PUSCH resources for transmitting data corresponding to other CG-enabled HARQ process of UEs choice (in this example F it is #2).

FIG. 5 shows an example G and H in accordance with example embodiments of the invention. FIG. 5 shows UE CG PUSCH Transmission 510, gNB scheduling 520, and Scheduled UE transmission 530. FIG. 5 shows an embodiment of Alt2 of Step 5a as discussed above. As shown in FIG. 5 example G, gNB indicates M=2, but UE transmitted three TBs h1, h2, and h3 in the UE CG PUSCH Transmission 510 burst.

It is noted that in FIG. 5 it can be assumed that the gNB misses UCI of the h2 (or h4):

Example G and H (corresponds to Alt2 of Step 5a: UE transmits 3 TBs in the CG-PUSCH burst. The received multi-TTI UL grant with cyclic redundancy check bits scrambled with CS-RNTI schedules two (M=2) transmissions:

if an indicated HARQ ID has the NDI toggled (corresponding to new transmission), UE skips the transmission of (here HARQ-ID #1), and re-transmits the remaining PUSCHs corresponding to the other HARQ-IDs (#3 & #6) as shown in Example G. Otherwise, if a retransmission is scheduled for the HARQ process #1, UE retransmits HARQ processes #1 and #3, as in the previous examples.

An advantage of the Alt2 of Step 5a is that the linkage between NDI bits indicated in the multi-TTI scheduling DCI and corresponding HARQ-process cannot become ambiguous. The disadvantage is that some processes may be re-transmitted, even though gNB already received those correctly, but this happens only if gNB misses UCI of CG-PUSCH transmitted by the UE. It is assumed that UCI would be much more reliable than PUSCH.

FIG. 6 shows an embodiment of Linkage method #2 in accordance with example embodiments of the invention. FIG. 6 shows UE CG PUSCH Transmission 610, gNB scheduling 620, and Scheduled UE transmission 630.

In FIG. 6 there is shown in the multi-TTI UL grant signalled by the gNB that a timing offset is used (instead of the HARQ process ID) to identify the first PUSCH transmission in the (preceding) CG-PUSCH burst that the UE should be retransmitted. The time offset may be indicated by reusing HARQ-ID field or by adding an additional DCI field in the multi-TTI UL grant. In this example, offset is indicated relative to the first configured transmission of the latest CG burst. In other embodiments, offset may be relative to slot/symbol/half-slot where the multi-TTI grant has been received. The advantage of linkage method 2 is that it allows the gNB to schedule a retransmission for the Xth HARQ process transmitted in the CG-PUSCH burst in cases where the gNB may be able detect a transmission from the UE (e.g. based on the detection of UE-specific DMRS) but cannot decode the UCI—including information on the UE-selected HARQ process ID.

FIG. 8A and FIG. 8B each show a method in accordance with example embodiments of the invention which may be performed by an apparatus.

FIG. 8A illustrates operations which may be performed by a network device such as, but not limited to, a network device, such as the UE 110 as in FIG. 7. As shown in step 810 of FIG. 8A there is receiving, by a network device of a communication network, information comprising a multiple transmission time interval uplink grant with cyclic redundancy check bits scrambled by a radio network temporary identifier. As shown is step 820 of FIG. 8A there is, based on the information, determining, by the network device, a subset of data transmissions of a previous burst of data transmissions to be retransmitted by the network device. Then as shown in step 830 of FIG. 8A there is, based on the determining, performing by the network device retransmission of the subset of data transmissions using scheduled resources of the uplink grant.

In accordance with the example embodiments as described in the paragraph above, wherein the subset of data transmissions is of at least one physical uplink shared channel transmission of the previous burst of data transmissions to be retransmitted.

In accordance with the example embodiments as described in the paragraphs above, wherein information comprising the uplink grant comprises at least one process identification value associated with the previous burst of data transmissions to be retransmitted and a number of transmission time intervals scheduled by the uplink grant.

In accordance with the example embodiments as described in the paragraphs above, wherein based on the uplink grant having cyclic redundancy check bits scrambled with a configured scheduled radio network temporary identifier, the network device is including configured grant-uplink control information for each data transmission of the subset and the retransmission is using a scheduled resource of the uplink grant associated with a process identification value for each data transmission.

In accordance with the example embodiments as described in the paragraphs above, wherein based on the uplink grant having cyclic redundancy check bits scrambled with a cell radio network temporary identifier, the retransmission is using scheduled resources of the uplink grant associated with consecutive process identity values starting with an initial process identity value indicated by the at least one process identification value.

In accordance with the example embodiments as described in the paragraphs above, wherein the at least one process identification value of the uplink grant is identifying for the retransmission one of subframe, slot, or symbol of different transmission time intervals of a previously configured grant burst.

In accordance with the example embodiments as described in the paragraphs above, wherein the at least one process identification value is a first process identification value indicative for a first transmission of the retransmissions.

In accordance with the example embodiments as described in the paragraphs above, wherein the at least one process identification value is indicative of a time offset relative to a first slot of the uplink grant, wherein the time offset is identifying a first subframe, slot, or symbol for a first transmission of the retransmission.

In accordance with the example embodiments as described in the paragraphs above, wherein the process identity of at least one further retransmission other than the first transmission of the subset of data transmissions is determined implicitly based on a first process identity of the at least one process identification value and a duration in the uplink grant.

In accordance with the example embodiments as described in the paragraphs above, wherein each process identification scheduled by the grant is determined consecutively starting with at least one process identification value, based on the uplink grant being scrambled by a radio network temporary identifier uplink (dynamic grant RNTI).

In accordance with the example embodiments as described in the paragraphs above, a process identification value can be based on at least one bit field indicated to a network device with signaling such as but not limited to an uplink grant.

In accordance with the example embodiments as described in the paragraphs above, the process identification value may indicate explicitly the HARQ process identity of certain data transmission, or it may indicate e.g. a reference in time to a previous data transmission.

In accordance with the example embodiments as described in the paragraphs above, process identity value may be e.g. a HARQ process identity, that the UE derives based on one or more process identification values In accordance with the example embodiments as described in the paragraphs above, wherein based on the information indicating a number of transmissions associated with the uplink grant is exceeding the number of retransmissions of the previous burst of data transmissions, the network device is using at least one transmission associated with the uplink grant for transmitting a data with a process identity value other than the process identity values corresponding to processes used for the retransmissions.

In accordance with the example embodiments as described in the paragraphs above, wherein based on the information indicating a number of transmissions associated with the grant is different than a number of transmissions transmitted in the previous burst of data transmissions by the network device, the network device ignores a new data indicator of the uplink grant and retransmits the previous burst of data transmissions.

In accordance with the example embodiments as described in the paragraphs above, wherein the at least one process identification value comprises at least one hybrid automatic repeat request process identity.

In accordance with the example embodiments as described in the paragraphs above, wherein the information is received from a network node associated with the communication network.

A non-transitory computer-readable medium (memory (ies) 125 as in FIG. 7) storing program code (computer program code 123 and/or determination module 140-2 as in FIG. 7), the program code executed by at least one processor (processor(s) 120 and/or determination module 140-1) as in FIG. 7) to perform the operations as at least described in the paragraphs above.

In accordance with an example embodiment of the invention as described above there is an apparatus comprising: means for receiving (e.g., one or more transceivers 130, memory(ies) 125, computer program code 123 and/or determination module 140-2, and processor(s) 120 and/or determination module 140-1 as in FIG. 7), by a network device (e.g., UE 110 as in FIG. 7), information comprising a multiple transmission time interval uplink grant with cyclic redundancy check bits scrambled by a radio network temporary identifier; means, based on the information, for determining (e.g., one or more transceivers 130, memory (ies) 125, computer program code 123 and/or determination module 140-2, and processor(s) 120 and/or determination module 140-1 as in FIG. 7), by the network device of a communication network (e.g., network 100 as in FIG. 7), a subset of data transmissions of a previous burst of data transmissions to be retransmitted by the network device; and means, based on the determining, for performing (e.g., one or more transceivers 130, memory(ies) 125, computer program code 123 and/or determination module 140-2, and processor(s) 120 and/or determination module 140-1 as in FIG. 7) by the network device retransmission of the subset of data transmissions using scheduled resources of the uplink grant.

In the example aspect of the invention according to the paragraph above, wherein at least the means for receiving, determining, and performing comprises a non-transitory computer readable medium [memory(ies) 125 as in FIG. 7] encoded with a computer program [computer program code 123 and/or determination module 140-2 as in FIG. 7] executable by at least one processor [processor(s) 120 and/or determination module 140-1 as in FIG. 7].

FIG. 8B illustrates operations which may be performed by a network device such as, but not limited to, a network node RAN NODE 170 as in FIG. 7 or an access node such as an eNB or gNB. As shown in step 850 of FIG. 8B there is determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a network device. Then as shown in step 860 of FIG. 8B there is, based on the determining, sending the information towards the network device for use in retransmission of the subset of data transmissions using scheduled resources of the uplink grant.

In accordance with the example embodiments as described in the paragraphs above, wherein the subset of data transmissions is of at least one physical uplink shared channel transmission of the previous burst of data transmissions to be retransmitted.

In accordance with the example embodiments as described in the paragraphs above, wherein information comprising the uplink grant comprises at least one process identification value associated with the previous burst of data transmissions to be retransmitted and a number of transmission time intervals scheduled by the uplink grant.

In accordance with the example embodiments as described in the paragraphs above, wherein the uplink grant having the cyclic redundancy check bits scrambled with a configured scheduled radio network temporary identifier to cause the network device to include configured grant-uplink control information for each data transmission of the subset and to use a scheduled resource of the uplink grant associated with a process identification value for each data transmission of the retransmission.

In accordance with the example embodiments as described in the paragraphs above, wherein the uplink grant is having the cyclic redundancy check bits scrambled with a cell radio network temporary identifier to cause the network device to use for the retransmission scheduled resources of the uplink grant associated with consecutive process identity values starting with an initial process identity value indicated by the at least one process identification value.

In accordance with the example embodiments as described in the paragraphs above, wherein the at least one process identification value is identifying for the retransmission one of subframe, slot, or symbol of different transmission time intervals of a previously configured grant burst.

In accordance with the example embodiments as described in the paragraphs above, wherein the at least one process identification value is a first process identification value indicative for a first transmission of the retransmissions.

In accordance with the example embodiments as described in the paragraphs above, wherein the at least one process identification value is indicative of a time offset relative to a first slot of the uplink grant, wherein the time offset is identifying a first subframe, slot, or symbol for a first transmission of the retransmission.

In accordance with the example embodiments as described in the paragraphs above, wherein the process identity of at least one further retransmission other than the first transmission of the subset of data transmissions is determined implicitly based on a first process identity of the at least one process identification value and a duration in the uplink grant.

In accordance with the example embodiments as described in the paragraphs above, wherein each process identification scheduled by the grant can be determined consecutively starting with at least one process identification value, based on the uplink grant being scrambled by a radio network temporary identifier uplink (dynamic grant RNTI).

In accordance with the example embodiments as described in the paragraphs above, wherein the at least one process identification value comprises at least one hybrid automatic repeat request process identity.

A non-transitory computer-readable medium (memory(ies) 155 as in FIG. 7) storing program code (computer program code 153 and/or scheduling module 150-2 as in FIG. 7), the program code executed by at least one processor (processor(s) 152 and/or scheduling module 150-1 as in FIG. 7) to perform the operations as at least described in the paragraphs above.

In accordance with an example embodiment of the invention as described above there is an apparatus comprising: means for determining, (e.g., remote radio head (RRH) 195, memory(ies) 155, computer program code 153 and/or scheduling module 150-2, and processor(s) 152 and/or scheduling module 150-1 as in FIG. 7), by a network node (e.g., ran node 170 as in FIG. 7) of a communication network (network 100 as in FIG. 7), information comprising a multiple transmission time interval uplink grant with cyclic redundancy check bits scrambled by a radio network temporary identifier to identify a subset of data transmissions of a previous burst of data transmissions to be retransmitted by a network device; and means, based on the determining, for sending (e.g., remote radio head (RRH) 195, memory(ies) 155, computer program code 153 and/or scheduling module 150-2, and processor(s) 152 and/or scheduling module 150-1 as in FIG. 7), by a network node (e.g., ran node 170 as in FIG. 7) the information towards the network device for use in retransmission of the subset of data transmissions using scheduled resources of the uplink grant.

In the example aspect of the invention according to the paragraph above, wherein at least the means for determining and sending comprises a non-transitory computer readable medium [memory(ies) 155 as in FIG. 7] encoded with a computer program [computer program code 153 and/or scheduling module 150-2 as in FIG. 7] executable by at least one processor [processor(s) 120 and/or scheduling module 150-1 as in FIG. 7].

It is submitted that advantages of the operations in accordance with example embodiments of the invention as disclosed herein include that a network node, such as a gNB, is allowed to trigger retransmission or new transmission for CG-enabled HARQ processes with multi-TTI UL grants without limitations with respect to the ordering of the HARQ processes. This can result in benefits including at least:

lower latency compared to DFI-triggered retransmission; and lower control signaling overhead compared to single TTI-UL triggered retransmissions In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    receiving, by a user equipment of a communication network, information comprising a multiple transmission time interval uplink grant with cyclic redundancy check bits scrambled by a radio network temporary identifier;
    based on the information, determining a subset of data transmissions of a previous burst of data transmissions to be retransmitted by the user equipment; and
    based on the determining, performing retransmission of the subset of data transmissions using scheduled resources of the multiple transmission time interval uplink grant,
    wherein based on the information indicating a number of transmissions associated with the uplink grant is exceeding a number of retransmissions of the previous burst of data transmissions, using at least one transmission associated with the uplink grant for transmitting a data with a process identity value other than process identity values corresponding to processes used for the retransmissions.

2. The method of claim 1, wherein the subset of data transmissions is of at least one physical uplink shared channel transmission of the previous burst of data transmissions to be retransmitted.

3. The method of claim 1, wherein the information comprises at least one process identification value associated with the previous burst of data transmissions to be retransmitted and a number of transmission time intervals scheduled by the multiple transmission time interval uplink grant.

4. The method of claim 3, comprising:
    if the multiple transmission time interval uplink grant having cyclic redundancy check bits scrambled with a configured scheduled radio network temporary identifier,
        including configured grant-uplink control information in each data transmission of the subset; and
        using a scheduled resource of the multiple transmission time interval uplink grant associated with a process identification value for each data transmission of the retransmission.

5. The method of claim 3, comprising:
    if the multiple transmission time interval uplink grant having cyclic redundancy check bits scrambled with a cell radio network temporary identifier,
    using scheduled resources of the multiple transmission time interval uplink grant associated with consecutive process identity values starting with an initial process identity value indicated by the at least one process identification value for the retransmission, wherein the consecutive process identity values are one of determined or received by the user equipment.

6. A user equipment, comprising:
    at least one processor; and
    at least one memory comprising computer program code, the at least one memory and computer program code configured, with the at least one processor, to cause the apparatus at least to
    receive information comprising a multiple transmission time interval uplink grant with cyclic redundancy check bits scrambled by a radio network temporary identifier;
    based on the information, determine a subset of data transmissions of a previous burst of data transmissions to be retransmitted by the user equipment; and
    based on the determining, perform retransmission of the subset of data transmissions using scheduled resources of the multiple transmission time interval uplink grant; and
    based on the information indicating that a number of transmissions associated with the multiple transmission time interval uplink grant is exceeding a number of retransmissions of the previous burst of data transmissions, use at least one transmission associated with the multiple transmission time interval uplink grant for transmitting a data with a process identity value other than process identity values corresponding to processes used for the retransmissions.

7. The user equipment according to claim 6, wherein the subset of data transmissions is of at least one physical uplink shared channel transmission of the previous burst of data transmissions to be retransmitted.

8. The user equipment according to claim 6, wherein the information comprises at least one process identification value associated with the previous burst of data transmissions to be retransmitted and a number of transmission time intervals scheduled by the multiple transmission time interval uplink grant.

9. The user equipment according to claim 8, wherein the at least one memory and computer program code are further configured, with the at least one processor, to cause the apparatus at least to:
if the multiple transmission time interval uplink grant having cyclic redundancy check bits scrambled with a configured scheduled radio network temporary identifier,
include configured grant-uplink control information in each data transmission of the subset; and
use a scheduled resource of the multiple transmission time interval uplink grant associated with a process identification value for each data transmission of the retransmission.

10. The user equipment according to claim 8, wherein the at least one memory and computer program code are further configured, with the at least one processor, to cause the apparatus at least to:
if the multiple transmission time interval uplink grant having cyclic redundancy check bits scrambled with a cell radio network temporary identifier, use scheduled resources of the multiple transmission time interval uplink grant associated with consecutive process identity values starting with an initial process identity value indicated by the at least one process identification value for the retransmission.

11. The user equipment according to claim 8, wherein the at least one process identification value is a first process identification value indicative for a first transmission of the retransmissions.

12. The user equipment of claim 8, wherein the at least one process identification value is indicative of a time offset relative to a first slot of the multiple transmission time interval uplink grant, wherein the time offset is identifying a first subframe, slot, or symbol for a first transmission of the retransmission.

13. The user equipment of claim 9, wherein a process identification of at least one further retransmission other than the first transmission of the subset of data transmissions is determined implicitly based on a process identification of the at least one process identification value and a duration in the multiple transmission time interval uplink grant.

14. The user equipment according to claim 6, wherein the at least one memory and computer program code are further configured, with the at least one processor, to cause the apparatus at least to:
if the information indicates that a number of transmissions associated with the grant is different than a number of transmissions transmitted in the previous burst of data transmissions,
ignore a new data indicator of the multiple transmission time interval uplink grant; and
retransmit the previous burst of data transmissions.

15. The user equipment according to claim 8, wherein the at least one process identification value comprises at least one hybrid automatic repeat request process identity.

16. A method, comprising:
determining, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a user equipment; and
based on the determining, sending the information towards the user equipment for use in retransmission of the subset of data transmissions using scheduled resources of the multiple transmission time interval uplink grant,
wherein the information indicating a number of transmissions associated with the uplink grant is exceeding a number of retransmissions of the previous burst of data transmissions, causes the user equipment to use at least one transmission associated with the uplink grant for transmitting a data with a process identity value other than process identity values corresponding to processes used for the retransmissions.

17. The method of claim 16, wherein the information comprises at least one process identification value associated with the previous burst of data transmissions to be retransmitted and a number of transmission time intervals scheduled by the multiple transmission time interval uplink grant.

18. The method of claim 16, wherein the multiple transmission time interval uplink grant having the cyclic redundancy check bits scrambled with a configured scheduled radio network temporary identifier causes the user equipment to include configured grant-uplink control information in each data transmission of the subset and to use a scheduled resource of the multiple transmission time interval uplink grant associated with a process identification value for each data transmission of the retransmission.

19. The method of claim 16, wherein the multiple transmission time interval uplink grant having the cyclic redundancy check bits scrambled with a cell radio network temporary identifier causes the user equipment to use for the retransmission scheduled resources of the multiple transmission time interval uplink grant associated with consecutive process identity values starting with an initial process identity value indicated by the at least one process identification value in the multiple transmission time interval uplink grant.

20. An apparatus, comprising:
at least one processor; and
at least one memory comprising computer program code, the at least one memory and computer program code configured, with the at least one processor, to cause the apparatus at least to
determine, by a network node of a communication network, information comprising a multiple transmission time interval uplink grant with cyclic redundancy check bits scrambled by a radio network temporary identifier to identify a subset of data transmissions of a previous burst of data transmissions to be retransmitted by a user equipment; and
based on the determining, send the information towards the user equipment for use in retransmission of the subset of data transmissions using scheduled resources of the multiple transmission time interval uplink grant,
wherein the information indicating a number of transmissions associated with the uplink grant is exceeding the number of retransmissions of the previous burst of data transmissions, causes the user equipment to use at least one transmission associated with the uplink grant for transmitting a data with a process identity value other than process identity values corresponding to processes used for the retransmissions.

21. The apparatus of claim 20, wherein the information comprises at least one process identification value associated with the previous burst of data transmissions to be retransmitted and a number of transmission time intervals scheduled by the multiple transmission time interval uplink grant.

22. The apparatus of claim 20, wherein the multiple transmission time interval uplink grant having the cyclic redundancy check bits scrambled with a configured scheduled radio network temporary identifier causes the user equipment to include configured grant-uplink control information in each data transmission of the subset and to use a scheduled resource of the multiple transmission time interval uplink grant associated with a process identification value for each data transmission of the retransmission.

23. The apparatus of claim 20, wherein the multiple transmission time interval uplink grant having the cyclic redundancy check bits scrambled with a cell radio network temporary identifier causes the user equipment to use for the retransmission scheduled resources of the uplink grant associated with consecutive process identity values starting with an initial process identity values indicated by the at least one process identification value in the multiple transmission time interval uplink grant.

24. The apparatus of claim 21, wherein the at least one process identification value comprises at least one hybrid automatic repeat request process identity.

* * * * *